United States Patent
Sawai et al.

[11] Patent Number: 5,897,800
[45] Date of Patent: Apr. 13, 1999

[54] LASER BEAM MACHINE BASED ON OPTICALLY SCANNING SYSTEM

[75] Inventors: Hidekazu Sawai; Tsukasa Matsuno; Mitsunobu Oshimura; Eikichi Hayashi, all of Tokyo, Japan

[73] Assignee: Mitsubishi Denki Kabushiki Kaisha, Tokyo, Japan

[21] Appl. No.: 08/980,276

[22] Filed: Nov. 28, 1997

Related U.S. Application Data

[63] Continuation of application No. 08/779,613, Jan. 7, 1997, abandoned.

[30] Foreign Application Priority Data

Jul. 17, 1996 [JP] Japan .................................... 8-187591

[51] Int. Cl.$^6$ ................................................. B23K 26/10
[52] U.S. Cl. ............................ 219/121.79; 219/121.6
[58] Field of Search ........................... 219/121.6, 121.63, 219/121.67, 121.78, 121.79, 121.8, 121.81, 121.82, 121.84, 121.85; 372/109; 138/30; 359/223

[56] References Cited

U.S. PATENT DOCUMENTS

| | | |
|---|---|---|
| 3,615,846 | 10/1971 | Plank ........................................ 429/25 |
| 4,052,852 | 10/1977 | Hart ........................................... 60/478 |
| 4,600,114 | 7/1986 | Dabich ..................................... 220/722 |
| 4,669,465 | 6/1987 | Moore et al. ..................... 219/121.6 X |
| 4,727,237 | 2/1988 | Schantz .......................... 219/121.84 X |
| 4,880,213 | 11/1989 | Shinbori et al. ..................... 267/64.27 |
| 5,260,123 | 11/1993 | Hergenrother et al. ................ 442/183 |

FOREIGN PATENT DOCUMENTS

| | | |
|---|---|---|
| 60-3992 | 1/1985 | Japan ................................ 219/121.73 |
| 62-11953 | 3/1987 | Japan . |
| 63-299884 | 12/1988 | Japan ................................ 219/121.84 |
| 2-15895 | 1/1990 | Japan ................................ 219/121.84 |

Primary Examiner—Gregory L. Mills
Attorney, Agent, or Firm—Sughrue, Mion, Zinn, Macpeak & Seas, PLLC

[57] ABSTRACT

A beam confinement subsystem for an optical scanning system of a laser beam machine having a laser beam transfer path includes an expandable light path sealing and protecting member surrounding a portion of the laser beam transfer path, and a pressure adjusting buffer directly coupled to the expandable light path sealing and protecting member. Preferably, the pressure adjusting buffer including an expandable, airtight thin-film material. Additionally, the beam confinement can include a pressurized purge gas supply tank directly connected to the expandable light path sealing and protecting member to thereby provide greater protection from contamination to the laser beam transfer path.

10 Claims, 5 Drawing Sheets

A: CAPACITY OF BUFFER TANK
B: CAPACITY OF LIGHT PATH SEALING PROTECTOR
C: CAPACITY OF LASER BEAM TRANSFER PATH even where the volatile gas is well known to be a
LASER BEAM MACHINE BASED ON OPTICALLY SCANNING SYSTEM This is a Continuation of application Ser. No. 08/779,613 filed Jan. 7, 1997, now abandoned.

FIELD OF THE INVENTION

The present invention relates to an optical scanning system of a laser beam machine for machining a workpiece by scanning a focused laser beam over the workpiece. More specifically, the present invention relates to a beam confinement subsystem of an optical scanning system for a laser beam machine which includes a beam confinement subsystem.

BACKGROUND OF THE INVENTION

Conventional laser beam machines are disclosed, for example, in Japanese Patent Publication No. SHO 62-11953. FIG. 8 shows configuration of the conventional type of laser beam machine including an optical scanning system, while FIG. 9 shows part of the laser beam machine partially modified. In FIGS. 8 and 9, the reference numeral 1 indicates a laser oscillator for outputting a laser beam 2, which laser beam 2 is deflected by a bend mirror 3 to be lead to a machining lens 4. The laser beam 2 is converged by the machining lens 4 and applied to a workpiece 5, whereby laser machining is performed.

FIG. 8, i.e., the figure showing the conventional type of device, illustrates a one-axis laser beam machine including an optical scanning system. This machine has a configuration in which a machining head section 6 holding the bend mirror 3 and machining lens 4 is driven and moved for scanning in the X direction using well-known ball screws, a linear guide, and a servo motor or the like each not shown herein to execute machining such as cutting.

In the conventional type of device, an expandable light path sealing protector, i.e., a light path bellows 7, is provided for protecting a portion of a transfer path transferring the laser beam 2; a opposite light path bellows 8 is symmetrically connected to the side opposite to the light path via a communicating box 9.

Designated by the reference numeral 10 in FIG. 8 is an inspection hole cover of an inspection hole for adjusting the bend mirror 3 and inspecting for maintenance thereof in the communicating box 9. It will be appreciated that guide rollers 11, each of which is attached at an appropriate position to the light path bellows 7 and the opposite light path bellows 8, ride along a guide rail 12, i.e., a mechanism for guiding the guide rollers 11. FIG. 9 shows an alternative configuration in which an opening edge of the opposite light path bellows 8 is attached to the side face of the machining head section 6.

Next description is made of the operations associated with the conventional laser beam machines illustrated in FIGS. 8 and 9. In particular, it will be noted that the transfer path of the laser beam 2 from the laser oscillator 1 to the machining lens 4 comprises the light path bellows 7, communicating box 9 or bend mirror 3, opposite light path bellows 8 and machining head section 6, which elements cooperatively form a sealed room. The inside of this sealed room is filled with a clean gas (normally, clean air or dry air) which gas does not interfere with transfer of the laser beam 2 and does not contaminate the bend mirror 3 and machining lens 4. Thus, the sealed room protects the laser beam transfer path from the entrance of contaminated gas from outside of the transfer path. It will be appreciated that the presence of contaminated gas, e.g., a volatile gas, is well known to be a laser interfering gas for a carbon dioxide laser. It should be mentioned that the term "contaminated gas" indicates either a gas mixed with the volatile gas or dust, either of which will interfere with laser operation.

When the machining head section 6 is driven, for instance, in the + X direction, the light path bellows 7, the moving direction of which is restricted by the guide rollers 11 and the guide rail 12, expands while the opposite light path bellows 8 shrinks, and vice versa. The machining head section 6 is operated during movement thereof so that the pressure of the clean gas in the sealed room will always be kept at a substantially constant level to move the clean gas between the bellows 7 and 8 via either the communicating box 9 or the cylinder of the machining head section 6. For this reason, contaminated gas and dust cannot enter the laser beam transfer path from the outside.

The conventional type of laser beam machine including an optical scanning systems illustrated in FIGS. 8 or 9 requires a communicating box 9, which makes the device complicated and high priced. It will also be appreciated that the access to the bend mirror 3 for maintenance is not optimal. Moreover, as shown in FIG. 9, i.e., in the configuration in which the opposite light path bellows 8 is asymmetrically attached to the machining head section 6, the guide rail 12 for the light path bellows 7 cannot be shared with that of the opposite light path bellows 8. Thus, a guide rail is required specifically for support of the opposite light path bellows 8, which makes the device more complicated and more expensive. Furthermore, an opposite light path bellows 8 is required in addition to a light path bellows 7, which makes the device basically complicated and expensive. The problems with conventional laser beam machines of this type is increased in a multi-axis moving type machines. In particular, the opposite light path bellows 8 is rather an obstacle, which causes other performance characteristics of the machine, for instance, operability or the like, to suffer.

Furthermore, although a device using a pressure adjusting buffer tank is disclosed in Japanese Patent Publication No. SHO 62-11953, there have recently been pointed out several problems with the device. For example, the configuration of the laser beam machine becomes more complicated, particularly with respect to the enlargement of the area required for installation. This is due to the fact that the external dimensions of the pressure adjusting buffer tank included in the device are required to be much larger, i.e., in proportion to the drivable range of the device. Moreover, for the case wherein the laser beam transfer path is constructed with a member such as a bellows having a comparatively low degree of sealing performance, the path has been known to gradually permit contaminated gas to migrate from the outside of the laser beam transfer path to the inside, mostly in portions of the sealed room relatively far away from the pressure adjusting buffer tank. For this reason, it is necessary to maintain a high degree of sealing by using components in the light path, a combination including a duct fitted with an O ring, which makes the configuration even more complicated and expensive.

SUMMARY OF THE INVENTION

It is an object of the present invention to provide beam confinement subsystem for an optical scanning system of a laser beam machine which has a simple configuration. According to one aspect of the present invention, the beam confinement subsystem permits maintenance to be easily performed. According to another aspect of the present invention, the beam confinement subsystem does not introduce any obstacles within the operating range of the laser beam machine.

The laser beam machine advantageously includes an optical scanning system according to the present invention for performing laser machining by moving a bend mirror and a machining head section comprises a laser beam transfer path having an expandable light path sealing protecting member, and a pressure adjusting buffer operatively connected to the expandable light path sealing protecting member. Preferably, the pressure adjusting buffer may be made of an expandable thin-film material having an airtight characteristic.

Advantageously, the pressure adjusting buffer can be provided at a plurality of places. Moreover, a check valve can be provided in the laser beam transfer path to adjust a pressure applied to the light path sealing-protecting member or the pressure adjusting buffer. Preferably, a relatively porous protection cover can be provided to protect the pressure adjusting buffer. Additionally, a compressor for compressing the pressure adjusting buffer can also be provided. It should be mentioned that the pressure adjusting buffer can be formed from a plurality of compiled bags. Furthermore, a purge air supply can provided in the laser beam transfer path beam containment subsystem according to the present invention.

Other objects and features of this invention will become apparent from the following description, which description is made with reference to the accompanying drawings.

DETAILED DESCRIPTION OF THE PREFERRED EMBODIMENTS

Figure 1:
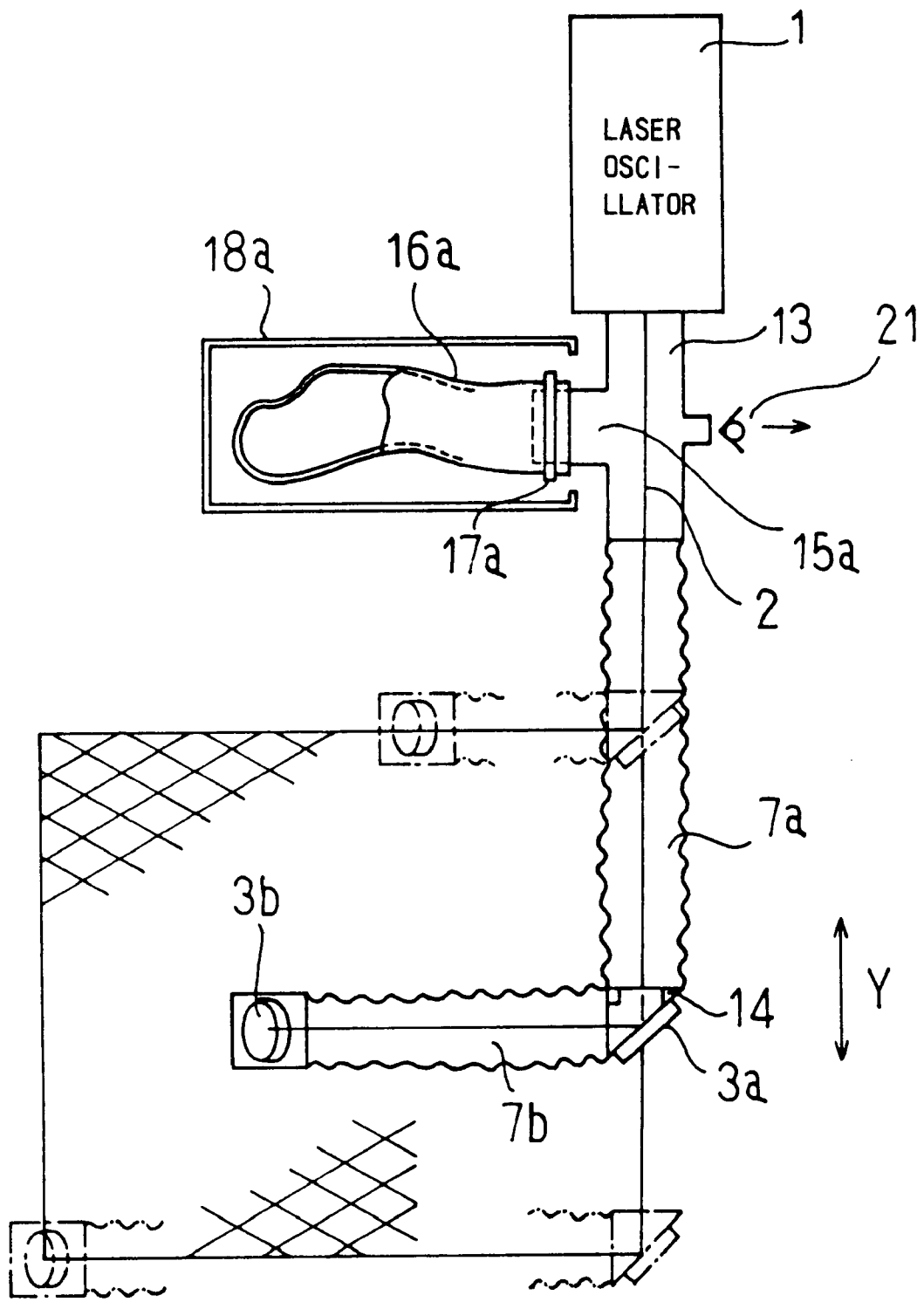
FIG. 1 is a plan view showing a beam confinement subsystem for an optical scanning system of a laser beam machine according to the first embodiment of the present invention.
Figure 2:
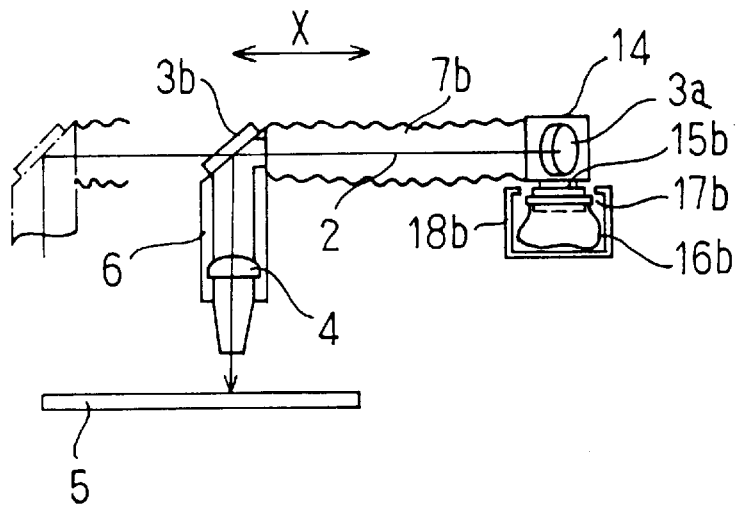
FIG. 2 is a side view showing the beam confinement subsystem for an optical scanning system of a laser beam machine according to the first embodiment of the present invention.

A detailed description or a first embodiment according of the present invention will now be presented with reference to FIG. 1 and FIG. 2. FIG. 1 and FIG. 2 are views showing the configuration of an optical scanning system for a laser beam machine according to the first embodiment. FIG. 1 is a plan view showing the first embodiment; FIG. 2 is a side view also showing the first embodiment. Both FIGS. 1 and 2 show a two axis (X, Y) laser beam machine including an optical scanning system having a beam confinement subsystem. In the figures, the reference numeral 1 indicates a laser oscillator for outputting a laser beam 2. Laser machining is performed using the laser beam 2, which is deflected by a first bend mirror 3a in the horizontal direction, and which is then deflected by a second bend mirror 3b in the vertical direction. The laser beam 2 is finally focused by a machining lens 4 and applied to a workpiece 5.

In the two-axis laser beam machine including an optical scanning system, a well-known gantry (not shown herein) can be used for holding the first bend mirror 3a, second bend mirror 3b, and machining lens 4 all of which are moved by a known linear driving mechanism, e.g., moves in the Y direction shown in FIG. 1. On the other hand, in the exemplary configuration using the gantry, the first bend mirror 3a is fixed in relation to the X direction and, in contrast, the second bend mirror 3b and the machining lens 4 move together with each other in the X direction shown in FIGS. 1 and 2. For this reason, when a position of a bend mirror or the like, indicated by an alternate long and short dash line, is set to a stroke end of each of the axes, an X-Y plane having the range indicated by the shaded area can be subjected to laser machining.

Figure 8:
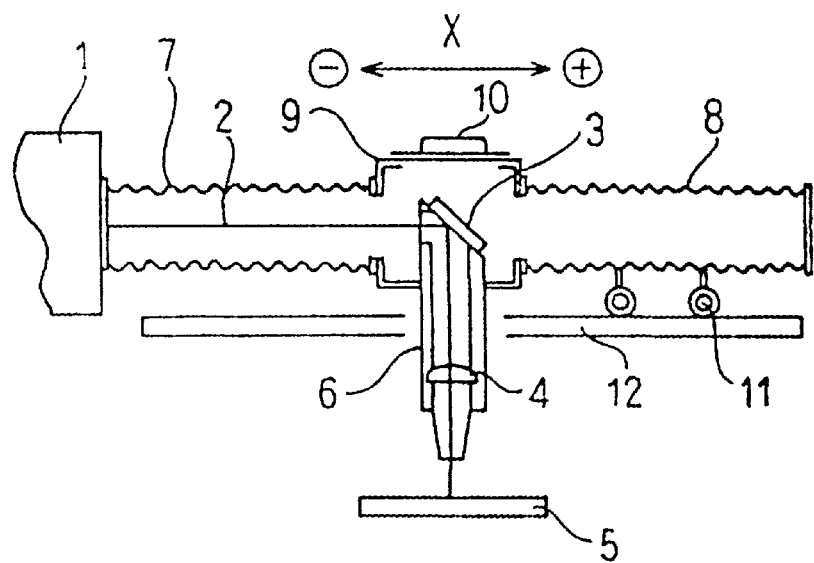
FIG. 8 is a view showing configuration of the conventional type of laser beam machine including an optical scanning system.
Figure 9:
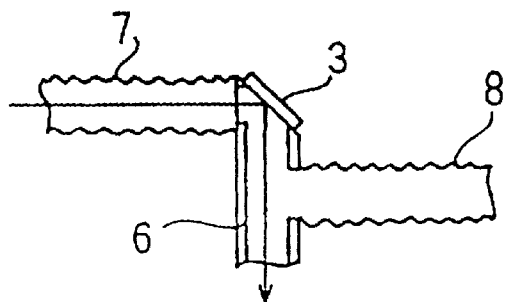
FIG. 9 is a view showing partial configuration of another conventional type of laser beam machine including an optical scanning system.

In the device according to the first embodiment of the present invention, a portion of the transfer path for transferring a laser beam 2 has expandable light path sealing protectors (light path sealing-protecting members). More specifically, a Y-axis light path bellows 7a and an X-axis light path bellows 7b advantageously form the expandable light path sealing protector. It will be noted that the oscillator 1 and the Y-axis light path bellows 7a are connected to each other with a fixed duct 13 having a check valve 21. The Y-axis light path bellows 7a and the X-axis light path bellows 7b are connected to each other via a bend block 14. Preferably, the X-axis light path bellows 7b is connected to the machining head section 6. A moving direction of each of the bellows described above, although it is not shown herein, is restricted by and guided by guide rollers and a guide rail like that in the device including the conventional technology, as illustrated in FIGS. 8 and 9.

Still referring to FIGS. 1 and 2, the reference numeral 15a indicates an opening section provided in the fixed duct 13 of the laser beam transfer path, and the reference numeral 15b indicates an opening section provided in the bend block 14 thereof. Bags 16a, 16b, each of which is made of a flexible thin-film material having a small modified resistance and having an airtight characteristic and each of which forms a pressure adjusting buffer, are attached to the opening sections 15a, 15b with hose bands 17a and 17b, respectively. The reference numerals 18a, 18b indicate protection covers each provided outside of the bags 16a, 16b, respectively.

The transfer path of a laser beam 2 from the laser oscillator 1 to the machining lens 4 comprises the duct 13, bags 16a 16b, Y-axis light path bellows 7a, bend block 14, X-axis light path bellows 7b, machining head section 6, first bend mirror 3a, and second bend mirror 3b. It will be appreciated that these components form a sealed room.

Next, a detailed description of the operations of the laser beam machine including an optical scanning system according to the first embodiment of the present invention is presented. The description, which follows, make reference to results obtained by experiment, which were conducted by the present inventors. The laser beam machine used in the experiments was a two-dimensional (X-Y) laser beam machine including an optical scanning system incorporating therein a 2 kW-class carbon dioxide laser oscillator used to cut and machine steel plates of regular sized material, i.e., 4-Shak. by 8-Shak, where 1-Shak.=0.30303 m, into required patterns. The maximum machining feed speed of each of the axis is 15 m/min while the stroke is 1250 mm in the X axis and 2500 mm in the Y-axis direction. Advantageously, the outer diameter of a transferred laser beam is about $\phi$ 30 mm.

When the machining head section 6 moves during laser machining, the X-axis light path bellows 7b and Y-axis light path bellows 7a expand or shrink, allowing gas, e.g., air, between the bellows rooms 16a, 16b moves to each other because expansion or shrinkage of the airtightness bags, each of which is made of a flexible thin-film material connected to each room via the opening section 15a of the fixed duct 13 communicated therebetween, and effects or operates so that the pressure of the air in the sealed room described above can always be maintained at a substantially constant level.

In a case where the laser beam transfer path (the Y-axis light path bellows 7a herein) is long, buffers 16a and 16b are provided in both edges of the bellows 7a and 7b, so that the buffers in both edges quickly expand according to shrinkage of the bellows, which allows the pressure in the transfer path to be maintained at a more constant and uniform state. For this reason, even if the transfer path comprises a bellows or the like with comparatively low degree of sealing, contaminated air is not permitted to migrate into the bellows 7a, 7b from outside of the transfer path, which makes it possible to provide sufficient optical performance. The optical performance can further be stabilized by dividing the bellows, providing an opening section therebetween, and adding a bag thereto if required.

Furthermore, even in a case where each of the X-axis light path bellows 7b and Y-axis light path bellows 7a discretely expands or shrinks, each of the bags 16a, 16b closest thereto quickly expands or shrinks, so that a pressure distribution in the laser beam transfer path is made uniform, further limiting the migration of contaminated air from the outside of the transfer path. Advantageously, this makes it possible to sufficiently deliver the desired optical performance.

Experiments on a content volume of a bag were conducted. It is generally known, as a result of computation, that a total volume of the transfer path, when each light path bellows of the laser beam machine described above expands, is about 30 liters. This volume is calculated based on the assumption that the average sectional dimensions of the bellows are 85×85 mm and total dimensions at the maximum expansion are (2750+1375)=4125 mm. Based on this calculation, a commercial garbage bag with the dimensions of 650 mm×800 mm and nominal content volume of 45 liters was used in the experiments. It was recognized that excellent expansion or shrinkage operation can be provided as expected through computing without generating any problem such as breakage of the bag due to its excessive expansion or suction thereof from the opening section 15a into the fixed duct 13 due to its excessive shrinkage. The dimensions of the device used for the experiment are about 3.5 m×7 m including the control unit, and dimensions of the bags 16a and 16b each functioning as a pressure adjusting buffer tank are much smaller as compared to the laser beam machine described above.

It should be mentioned that with this feature, it is clearly understood that the bags do not cause an increase in the area required for installation of the device, i.e., the laser beam machine. It should also be noted that, although two bags (a bag 16a, a bag 16b) are provided in this embodiment, one bag may be provided in a case where a length of the light path is short or space is at a premium.

As characteristics required for the bags forming buffers 16a and 16b, it is desirable that each of the bags has a high degree of flexibility as well as the ability to form an airtight buffer. Moreover, the bag material preferably has an excellent response capability to expansion or shrinkage of each of the bellows while, at the same time, the material of the bags has characteristics each adapted to the physical environment, e.g., high wear resistance and/or chemical inertia. However, the characteristics described above cannot be realized by using a single bag. Accordingly, the characteristics described above can be realized by using a plurality of compiled bags and allocating the functions required collectively of each of the bags to one of the bag plies. As a result of the experiments, as an example, it is recognized that polyethylene, which is a synthetic resin material having high flexibility and high airtightness, is suitable for an internal bag, primarily because it is cheap and excellent in the performance, while a fluorine-based material is suitable for an external bag or ply because of its chemical inertness. Advantageously, the coefficient of friction of the fluorine-based material is low and, thus, the wear resistance is high, which makes the bags constructed in this manner excellent in operation.

In a case where an excessive pressure is erroneously loaded to the inside of the laser beam transfer path, there is the possibility that a light path sealing protector such as a buffer or a bellows or the like will be ruptured. For this reason, as shown in FIG. 1, a check valve 21 is provided in the laser beam transfer path, so that the valve operates so as to avoid the possibility described above.

Furthermore, because the bags 16a and 16b are thin-films, they may be broken or cut when they contact or are caught by any construction around them during operations. For this reason, protection covers 18a and 18b are provided outside of the bags 16a and 16b to prevent the accidents described above. When the bags 16a and 16b expand or shrink, interference with the expansion or shrinkage of the bags 16a and 16b due to fluctuations of the pressure between the protection covers 18a, 18b and the bags 16a, 16b is avoided by employing a meshed material, which is used for the protection covers 18a and 18b. Alternatively, a slit can be provided in the covers 18a, 18b so that the covers are not airtight, hence the expansion and/or shrinkage of the bags 16a and 16b will not to be hindered.

Figure 3:
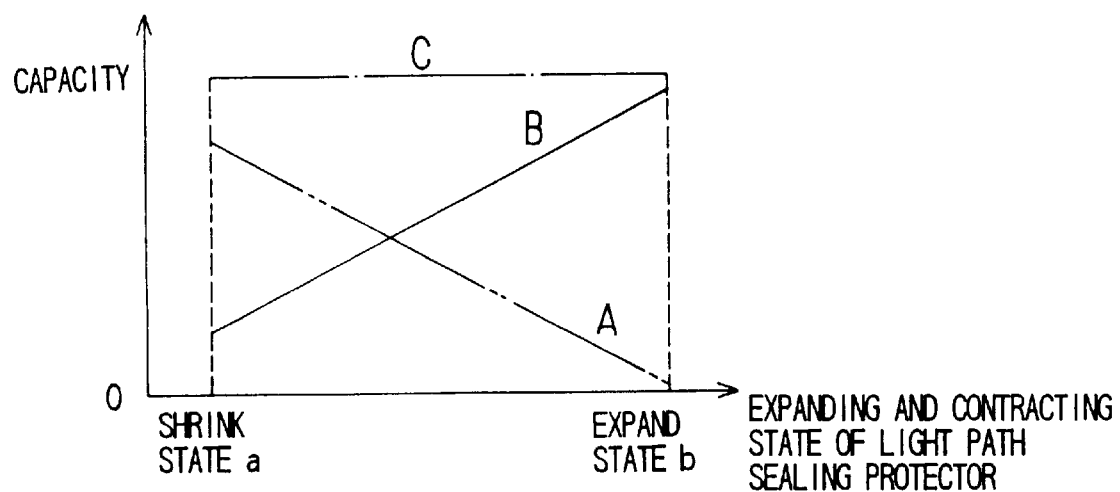
FIG. 3 is a view showing a relation between capacity change of the pressure adjusting buffer tank and that of the expandable light path sealing protection.
Figure 4:
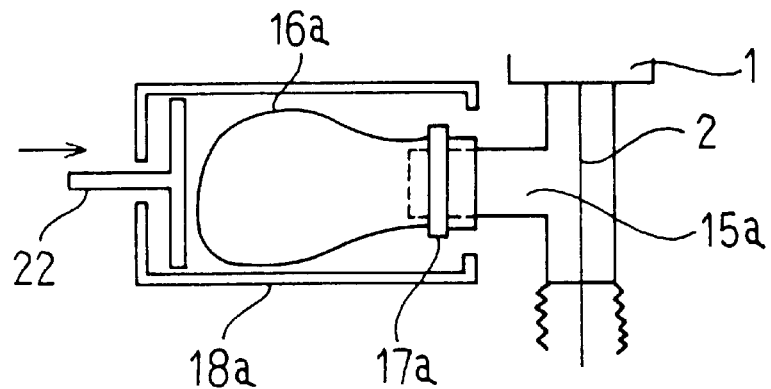
FIG. 4 is an explanatory view showing a case where a piston is provided in a protection cover of the beam confinement subsystem for an optical scanning system of a laser beam machine according to the second embodiment of the present invention.
Figures 5A, 5B:
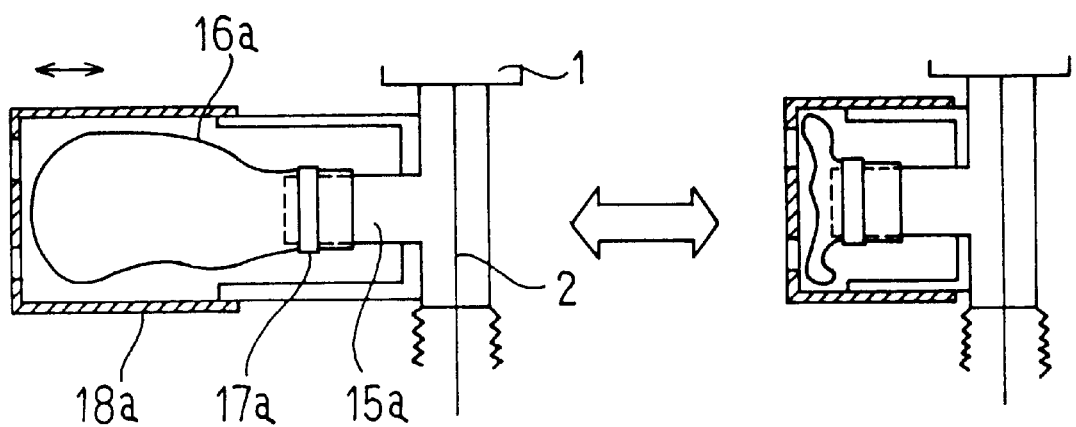
FIGS. 5A and 5B are explanatory views showing a configuration in which the protection cover according to the second embodiment of the present invention is a movable mechanism.

Next, a detailed description of a second embodiment of the present invention is made with reference to FIGS. 3 and FIG. 4, as wells as FIGS. 5A and 5B. FIG. 3 shows the relationship between capacity change of the pressure adjusting buffer and that of light path sealing protector, e.g., bellows 7a, 7b. The pressure adjusting buffer operates so that the sum of a capacity B of the light path sealing protector and a capacity A of the buffer tank coincides with the total capacity of the laser beam transfer path. It will be noted that when maintenance or the like of the laser beam machine is to be performed, and in a case where a load is applied to the bag from outside in a state where the light path sealing protector has shrunk, namely in a state a in which the bag forming the buffer has expanded, the relationship between the capacity of the buffer and the light path sealing protector is unbalanced, so that contaminated gas can migrate into the laser beam transfer path from outside thereof.

In the embodiment, for instance when maintenance of the laser beam machine is to be carried out, operation of the machine is stopped in the state b shown in FIG. 3. In order to insure shrinkage of the bag, a piston 22 for compressing the bag (shown in FIG. 4) is provided in the protection cover 18a. Alternatively, the protection cover 18a itself can be made drivable (as shown in FIGS. 5A and 5B). Because of this feature, the protection cover 18a operates so that the capacity relation shown in FIG. 3 will surely be maintained by discharging the gas in the bag and forcefully keeping the bag in the shrunken state.

Figure 6:
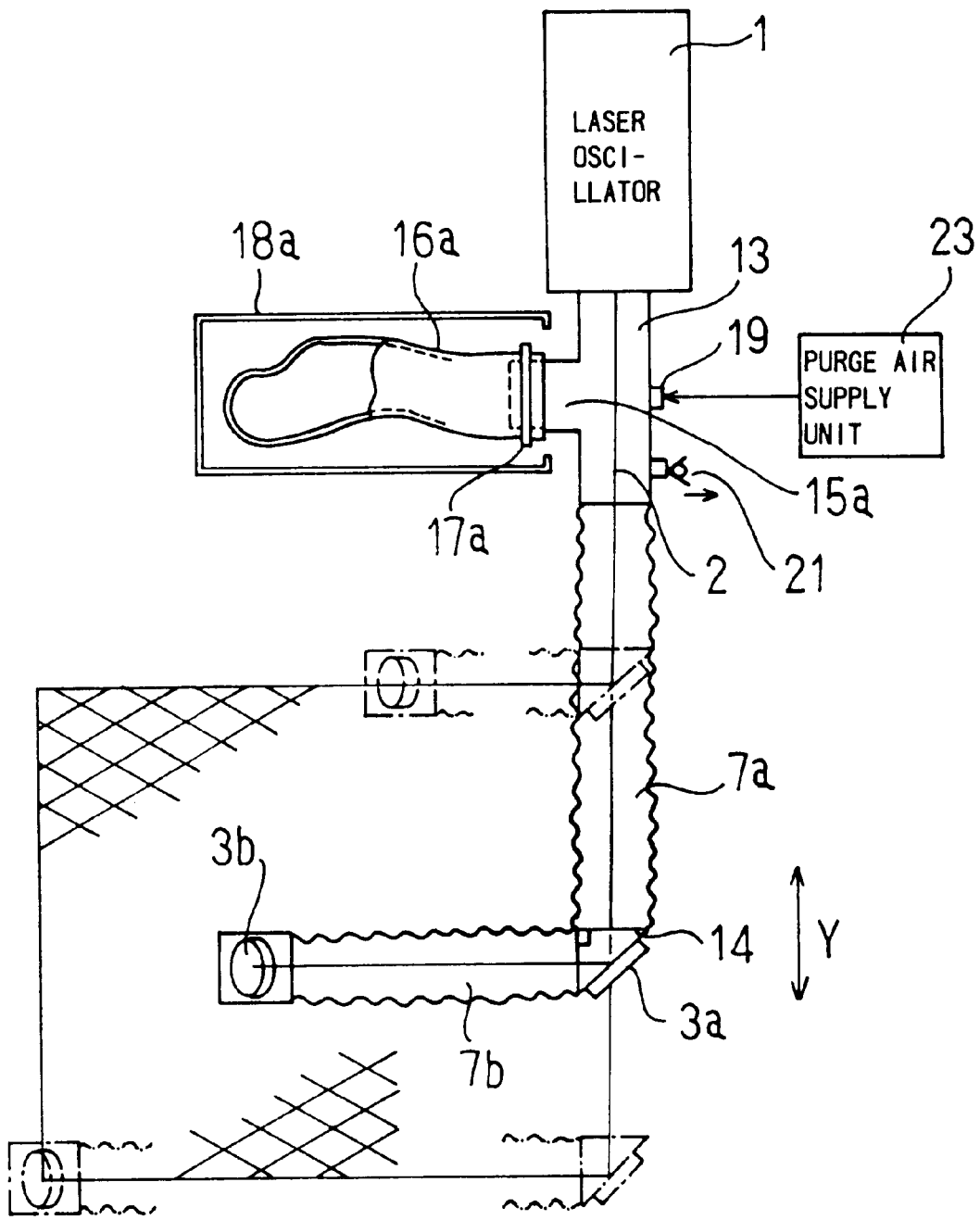
FIG. 6 is a plan view showing a beam confinement subsystem for an optical scanning system of a laser beam machine according to a third embodiment of the present invention.
Figure 7:
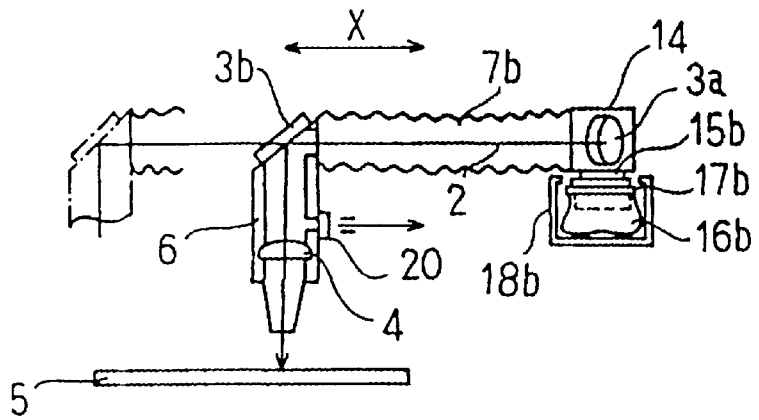
FIG. 7 is a side view showing the beam confinement subsystem for an optical scanning system of a laser beam machine according to the third embodiment of the present invention.

Next, a detailed description of a third embodiment of the present invention is made with reference to FIG. 6 and FIG. 7. The same reference numerals 1 to 18 are assigned to the elements in these figures corresponding to those in FIG. 1. Designated at the reference numeral 19 is a purge air supply port provided in the fixed duct 13, at 20 a purge air discharge port provided in the machining head section 6, and at 23 a purge air supply unit.

In the first and second embodiments described above, the laser beam transfer path is constructed so that the path is formed as a sealed room. In the third embodiment, as shown in FIG. 6, the purge air supply port 19 and the purge air discharge port 20 are opened to the outside of the transfer path.

A detailed description of operations and effects in the third embodiment will now be presented. In the sealed laser beam transfer path with only the bags 16a and 16b provided therein, a pressure of the gas in the transfer path can be kept substantially at the same level as that of external air. However, it is practically hard to make a bellows or a connecting section of the bellows or the like completely airtight. For this reason, there is the possibility that external air or dust may go into the transfer path, although the quantity may be very small, due to minute differences in pressure, i.e., between the pressure of gas inside the sealed room and the external air (atmospheric pressure). For this reason, the purge air supply unit 23 effects and operates so that any external air or dust will be prevented from coming into the transfer path by pumping or blowing clean dry air into the purge air supply port 19, thus keeping the pressure in the laser beam transfer path at a level higher than atmospheric pressure. The pressure maintained in the transfer path may be around 2 to 5 mm Hg. In order to clean the inside the transfer path, when the purge air supply port 19 is provided in the side near to the laser oscillator 1, the purge air discharge port 20 will be provided in the machining head section 6 in the nearer side to the machining lens 4 in the opposite side thereto. With this configuration, operations and effects for making a flow of purge air are also effective in further stabilizing the optical performance of the device.

In a case where bags 16a and 16b are not used in the device, in order to keep the pressure in the transfer path at a higher level than that of the external atmospheric pressure, when the transfer path expands, a larger quantity of purge air is required in proportion to the cross-sectional area of the transfer path as well as to the speed at which it expands. For this reason, the purge air supply unit becomes disadvantageously large and expensive. The device according to the third embodiment shown in FIG. 6 and FIG. 7 has solved the problems described above, and is effective in that the inside of the transfer path can be kept clean by a small-sized and low-priced purge air supply unit.

It should be noted that in the first through third embodiments described above, an exemplary case where a carbon dioxide laser is used for the laser beam machine is described. However, any type of laser beam machine for performing a beam transfer with a mirror, i.e., without using an optical fiber or the like, e.g., YAG laser beam machine, may be employed. It should also be mentioned that the form of the optical scanning system is not limited to a linear movement in which two axes are orthogonal to each other; a mechanism including a combination of rotational movement and linear movement over multiples axes, thereby facilitating the use of a polar coordinate system such as that found in a laser robot, may be employed.

Moreover, an expandable light path sealing protector according to the present invention includes not only the configuration in which only a bellows is provided therein but also the configuration wherein the protector is expandable in multiple stage, e.g., a telescoping protector. It will be appreciated that, even in the telescoping configuration described above, the same effects can be obtained as that described with respect to the first through third embodiments. With the present invention, even in a worst case where the laser beam transfer path is long and includes a multi-axis optical scanning system constructed with bellows having comparatively low degrees of sealing, external air or dust does not migrate into the laser beam transfer path. For this reason, it is possible to obtain an optical scanning system for a laser beam machine with the desired optical performance. In addition, a opposite light path bellows or the like as required in the conventional technology is unnecessary, which insures space savings, cost savings, and better operability.

Furthermore, since the pressure adjusting buffer includes a plurality of bags, it is possible to select the bags for appropriate functions, e.g., flexibility, airtightness, wear resistance, or chemical inertia, and since the pressure adjusting buffer includes a check valve and a protection cover having configuration which does not prevent operations of the bags, it is possible to easily achieve the performances described above without breakage of the bags, and without degradation of the device due to the peripheral environment. Moreover, the system described above can be operated without requiring any scheduled maintenance work or the like.

This application is based on Japanese patent application No. HEI 8-187591, which application was filed in the Japanese Patent Office on Jul. 17, 1996 and which patent application is incorporated by reference.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A beam confinement subsystem without a pressurized purge gas supply tank for an optical scanning system of a laser beam machine having a laser beam transfer path, said beam confinement subsystem comprising:

an expandable light path sealing and protecting member surrounding a portion of the laser beam transfer path;

a pressure adjusting buffer coupled to said expandable light path sealing and protecting member, said pressure adjusting buffer including an expandable, airtight thin-film material; and a porous protection cover surrounding said pressure adjusting buffer;

wherein said protection cover further comprises a compressing member which compresses said pressure adjusting buffer.

2. The beam confinement subsystem as recited in claim 1, wherein said pressure adjusting buffer comprises a plurality of pressure adjusting buffers, and wherein each of said pressure adjusting buffers is connected to a different respective portion of said expandable light path sealing and protecting member.

3. The beam confinement subsystem as recited in claim 2, wherein each of said pressure adjusting buffers comprises a plurality of compiled bags.

4. The beam confinement subsystem as recited in claim 1, wherein said pressure adjusting buffer comprises a plurality of compiled bags.

5. The beam confinement subsystem as recited in claim 1, further comprising a check valve operatively coupled to said expandable light path sealing and protecting member so as to permit relief of pressure applied to one of said expandable light path sealing and protecting member and said pressure adjusting buffer.

6. A beam confinement subsystem for an optical scanning system of a laser beam machine having a laser beam transfer path, said beam confinement subsystem comprising:

means for sealing and protecting the laser beam transfer path;

means for adjusting pressure in said sealing and protecting means; and means surrounding said pressure adjusting means for protecting said pressure adjusting means without interfering with the functioning of said pressure adjusting means;

wherein said sealing and protecting means is disposed surrounding a portion of the laser beam transfer path, said pressure adjusting means comprises an expandable, airtight thin-film material, and said protecting means further comprising a compressing member for applying compression to said pressure adjusting means.

7. The beam confinement subsystem as recited in claim 6, wherein said pressure adjusting means comprises a plurality of pressure adjusting means, and wherein each of said pressure adjusting means is connected to a different respective portion of said sealing and protecting means.

8. The beam confinement subsystem as recited in claim 7, wherein each of said pressure adjusting means comprises a plurality of compiled bags.

9. The beam confinement subsystem as recited in claim 6, wherein said pressure adjusting means comprises a plurality of compiled bags.

10. The beam confinement subsystem as recited in claim 6, further comprising means operatively coupled to said sealing and protecting means for relieving pressure applied to one of said sealing and protecting means and said pressure adjusting means.

* * * * *